Nov. 18, 1952     G. A. TINNERMAN     2,618,009
END FITTING FOR FURNITURE LEGS
Filed June 10, 1949
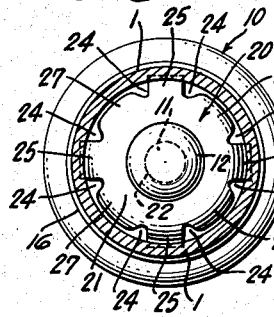
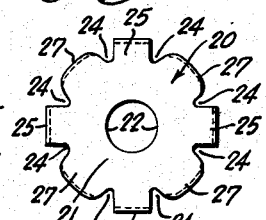
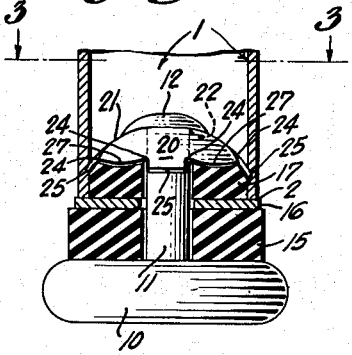
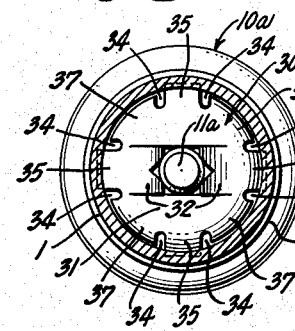
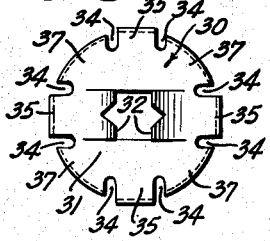
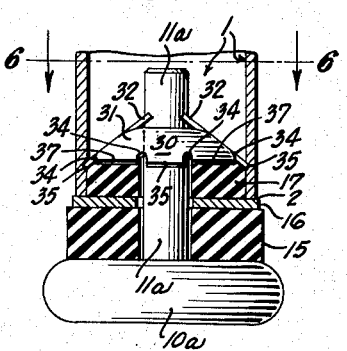
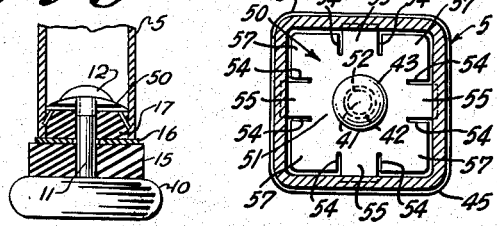
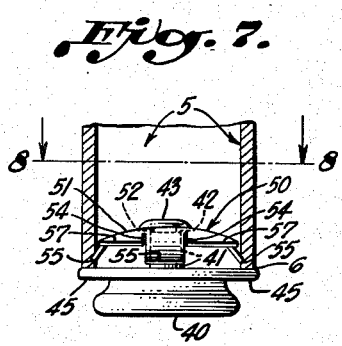
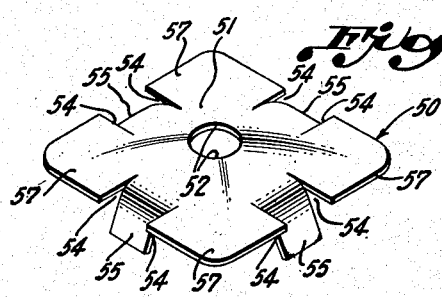
INVENTOR.
GEORGE A. TINNERMAN
BY
H. G. Lombard
ATTORNEY Patented Nov. 18, 1952

2,618,009

UNITED STATES PATENT OFFICE 2,618,009

END FITTING FOR FURNITURE LEGS

George A. Tinnerman, Cleveland, Ohio, assignor to Tinnerman Products, Inc., Cleveland, Ohio, a corporation of Ohio Application June 10, 1949, Serial No. 98,359

21 Claims. (Cl. 16—42)

This invention relates in general to furniture leg or furniture post end constructions and deals, more particularly, with improvements in the securing of various types of fittings onto the ends of tubular metal furniture legs or furniture posts to provide the same with feet, tips and similar devices for finishing off the ends thereof in the manufacture of tubular metal furniture, and the like.

A primary object of the invention is to provide various improved furniture leg constructions of this character in which an end fitting is embodied in an assembly with a simple sheet metal anchor plate, or the like, and this assembly applied easily and quickly to locked relation with the tubular metal post or leg to provide the same with a finished end construction in a simple and expeditious manner.

A further object of the invention is for the provision of such an assembly for an end fitting, or the like, comprising an anchor plate which is adapted for a self-locking action in applied position in the tubular metal post or leg, and said anchor plate otherwise retained in positive connection with a bolt or stud in the completed assembly to provide a unitary finishing attachment for the end of a tubular metal furniture post or leg which is strong and durable and admirably suited for economical quantity production at relatively low cost.

Further objects and advantages of the invention and other new and useful features in the construction, arrangement and general combination of parts will be readily apparent as the following description proceeds with reference to the accompanying drawings, for purposes of illustration but not of limitation, in which like reference characters designate like parts throughout, and in which:

Fig. 1 is a vertical sectional view of the end of a furniture post or leg construction showing the end fitting therefor as provided in an assembly with an anchor plate in accordance with the invention;

Fig. 2 is a top plan view of the anchor plate shown employed in Fig. 1; and,

Fig. 3 is a sectional view along line 3—3 of Fig. 1, looking in the direction of the arrows;

Fig. 4 is a vertical sectional view of the end of a furniture leg or post construction similar to Fig. 1 showing the assembly for the end fitting as provided with an alternate form of anchor plate in accordance with the invention;

Fig. 5 is a top plan view of the anchor plate shown employed in Fig. 4; and,

Fig. 6 is a sectional view along line 6—6 of Fig. 4, looking in the direction of the arrows.

Fig. 7 is a vertical sectional view of the end of a tubular furniture post or leg of generally square or rectangular cross-section and showing the end fitting therefor as provided in an assembly comprising another form of anchor plate in accordance with the invention;

Fig. 8 is a sectional view on line 8—8 of Fig. 7, looking in the direction of the arrows; and, Fig. 9 is a perspective view of the anchor plate shown employed in Figs. 7 and 8.

Fig. 10 is a vertical sectional view of the end of a tubular furniture post or leg of generally square or rectangular cross-section and showing the anchor plate of Fig. 9 in an assembly of Fig. 1.

Referring now, more particularly, to the drawings, Figs. 1 to 3 inclusive disclose one embodiment of the invention as provided in a furniture foot or furniture tip assembly which is secured onto the end of a furniture post or leg 1 in the form of a generally cylindrical tube or pipe comprising the lower portion of a leg or post of a chair, table or other article of tubular metal furniture, or the like. The end of the tubular post or leg 1 is square-cut and thereby defines an annular peripheral edge 2 at the end of said tubular post or leg 1.

The foot or tip assembly in accordance with the invention is readily provided to include any suitable type of fitting in the form of a cap 10, tip, caster, or similar device having a shank 11 in the form of a rivet-like stud projecting in generally normal relation to the underside of said cap or tip device 10. The several parts or members of the foot or tip assembly are all retained on said stud 11 and, as shown in Fig. 1, these parts comprise a disc-like rubber cushion 15, a metallic washer 16, and a rubber bushing or insert 17, all having concentrically aligned holes receiving said stud 11 of the fitting 10. At the inner end of the assembly, a generally convex or dish-shaped anchor plate member 20 is secured onto the end of said stud 11 to retain the several parts of the assembly in the assembled relation shown in Fig. 1. In the present example, the anchor plate 20 is shown provided with a central stud opening 22, the marginal portions of which define means for engaging a riveted or peened head 12 formed on the end of said stud 11 such that the several parts of the foot or tip assembly are retained in compact assembled relation in the manner of a unitary attachment, or the like.

In the assembly thus provided, the intermediate metallic washer 16 approximates the general size and contour of the peripheral edge 2 at the end of the post or leg 1 so as to define a seat for said peripheral edge 2, and this seat is supported on a resilient mounting provided by the rubber cushion or washer 15, while the rubber bushing or insert 17 is snugly received within the tubular wall of the post or leg 1 to bolster the stud or shank 11 of the fitting 10 against lateral thrust or tilting in a completed installation. In this relation, the anchor plate 20 is adapted to lock the assembly in attached position on the end of the tubular post or leg 1 in a manner whereby the fitting 10 serves as a foot or end trimming which closes the end of the tubular post or leg 1 against the entrance of foreign matter and eliminates any sharp edges thereon which would cut, scratch or otherwise injure any finished surface on which the leg or post end 1 might rest or slide.

The anchor plate 20 is a relatively simple, inexpensive article of manufacture which may be readily produced at very low cost from any suitable sheet metal material such as heat treated and tempered spring metal of cold rolled metal having spring like characteristics. The anchor plate 20 is readily provided from a simple sheet metal blank which preferably is formed into a generally convex or dish-shaped base or body portion 21 having a central stud opening 22, the marginal portions of which define means for engaging the riveted or peened head 12 on the stud 11 in the connected relation of the anchor plate with said stud, as aforesaid.

The anchor plate 20 is provided on its periphery with a series of spaced V-shaped notches or recesses 24 defining a series of spaced resilient spring shoulders 25 having cutting edges on their extremities and separated by similar land portions 27 of slightly less length than said resilient shoulders 25. The extremities of said land portions 27 preferably are provided to conform with the contour of the inner cylindrical wall of the tubular post or leg 1 but in a reduced size so as not to engage said inner wall in the applied attached position of the anchor plate as shown in Fig. 3. The resilient shoulders 25, however, are longer than said land portions 27 and project materially beyond the outline of said inner wall of the tubular post or leg 1 when the anchor plate is in normal untensioned condition, and accordingly, in the applied final position of the anchor plate, the cutting edges on the extremities of said resilient shoulders 25 are adapted to cut and dig into embedded anchored relation in said inner wall at spaced points.

Preferably the notches or recesses 24 are so provided as to define the resilient shoulders 25 in the manner of diametrically opposite resilient tabs or strips which are of sufficient length to extend downwardly in the generally convex body of the anchor plate and project outwardly beyond the land portions 27. The resiliency of the spring shoulders 25 is, of course, controlled by the depth of the notches 24 and, by varying the depth of these notches, the resiliency of said resilient spring shoulders 25 may be increased or diminished as necessary or desirable. As shown in Fig. 3, the cutting edges at the extremities of the spring shoulders 25 are adapted to engage material surface portions of the inner tubular wall of the post or leg 1 and to embed therein in what may be termed line or edge contact with said inner tubular wall, and thus, said spring shoulders 25 also serve as abutments which support and rigidify the anchor plate 20 in final attached position in said tubular post or leg 1. The anchor plate 20 otherwise is so provided that, in its normal untensioned condition, the cutting edges on the extremities of the spring shoulders 25 project materially beyond the outline or contour of the tubular inner wall of the post or leg 1 and must be compressed radially inwardly to pass within said tubular wall.

In the initial application of the foot or tip assembly to the end of the post or leg 1, the extremities of said spring shoulders 25 and also the convex base or body 21 of the anchor plate are adapted to yield as necessary for this purpose, and accordingly, said anchor plate and the adjacent rubber bushing 17 of the assembly are easily and quickly inserted within the tubular wall of the post or leg 1. The assembly is then pushed axially to final position in which the metallic washer 16 is disposed in abutting engagement with the end edge 2 of the post or leg 1 and thereby seats said post end on the resilient mounting provided by the rubber cushion 15. As the anchor plate 20 is pushed to such final position, the extremities of the land portions 27 slide freely over the inner tubular wall of the tubular post or leg 1 and thereby maintain the anchor plate 20 centered with respect to said tubular inner wall as said spring shoulders 25 are flexed radially inwardly by engagement with said tubular inner wall. Said spring shoulders 25 are thereby tensioned in final position and attempt to assume their initial untensioned relation in the untensioned condition of the anchor plate. Accordingly, in the final attached position of the anchor plate, Figs. 1 and 3, the tensioned spring shoulders 25 automatically force the cutting edges on the extremities thereof to cut into and become embedded in the inner tubular wall of the post or leg 1 under constant spring tension in what may be termed a self-locking action of the anchor plate in its final applied position. In this relation, said spring shoulders 25 embed in said tubular inner wall along material surface portions thereof to thereby serve as abutments which support and rigidify the anchor plate in final attached position in the tubular post or leg 1. At the same time, the rubber bushing or insert 17 is disposed in compressed condition within said inner tubular wall and thereby bolsters the stud 11 against lateral thrust or tilting in a manner whereby the end fitting 10 is firmly and rigidly supported in attached position on the end of the tubular post or leg 1, and the same otherwise locked in such attached position by the embedded anchored relation of the spring shoulders 25 of the anchor plate with the inner tubular wall of the post or leg 1, as aforesaid.

Figs. 4–6 inclusive disclose another form of the invention comprising a similar foot or tip assembly wherein the end fitting 10a is provided with a plain stud 11a to which an alternate form of anchor plate is connected in the manner of a clutch type of fastening device to retain the parts of the assembly in the assembled relation shown in Fig. 4, and adapted to be applied for use in a completed installation substantially as described with reference to Figs. 1–3 inclusive. The anchor plate 30 in this form of the invention comprises a similar generally convex, dish-shaped base or body 31 having a central stud opening provided by a pair of spaced tongues or similar stud engaging elements 32 pressed out of the material of said base or body 31. The periphery of the anchor plate 30 is provided with a series of spaced notches or recesses in the form of simple slots 34 defining the diametrically opposite resilient spring shoulders 35 having cutting edges on the extremities thereof and separated by similar land portions 37 of less length than said spring shoulders 35.

The stud engaging elements 32 are best formed in the sheet metal material of the central base or body portion 31 of the anchor plate by an aperture intermediate spaced parallel slits to provide said stud engaging elements 32 in the manner of cooperating resilient tongues, or the like, having spaced extremities defining a stud opening therebetween of less area than the cross-section of the stud shank 11a. The resilient tongues 32 are capable of flexing slightly outwardly out of the general contour of the convex base or body portion 31, as seen in Fig. 4, and thus, are adapted to be connected to the stud shank 11a in the manner of a clutch device in which the tongues 32 flex outwardly and slide over the stud shank 11a in one direction to final applied position and cut and dig into the stud shank in any such applied position to resist reverse movement of the anchor plate in the opposite direction. To this end, said tongues 32 preferably are provided with V-shaped extremities, as shown, defining biting jaws adapted to cut into the stud shank 11a at spaced points to lock the anchor plate in any applied position on said stud 11a. It will be understood, accordingly, that in the completed assembly shown in Fig. 4, the several parts comprising the rubber cushion 15, metallic washer 16, and rubber insert or bushing 17, are assembled onto the stud 11a and the anchor plate 30 then applied by passing the free end of said stud 11a between the spring tongues 32 to a position in which the anchor plate retains the said parts in a compact assembly in the manner of a unitary attachment. The foot or tip assembly thus provided is substantially the same as that shown and described with reference to Figs. 1-3 inclusive and likewise, is easily and quickly inserted into the tubular inner wall at the end of the post or leg 1 to provide the same general type of completed end construction in which the cutting edges on the extremities of the spring shoulders 35 cut into and embed in the surface of said inner tubular wall to lock the anchor plate 30 and the associated end fitting in attached position on the end of said tubular post or leg 1.

Figs. 7 to 9 inclusive, disclose another form of the invention in which the tubular post or leg 5 is in a generally square or rectangular cross-section, as illustrated in Fig. 8, and is provided with a square-cut, generally rectangular peripheral edge 6 on the outer end thereof, Fig. 7. The fitting 40 is provided in a simplified one-piece construction comprising a cap or tip having a stud 41 in the form of a rivet, or the like, and an integral washer-like flange 45 which seats the outer peripheral edge 6 of the tubular post or leg 1 as shown in Fig. 7. The stud 41 is formed with a reduced end defining a collar 42, Figs. 7 and 8, which supports the anchor plate 50 in a riveted connection 43 on the end of said stud 41. The anchor plate 50 is shown provided in the same general manner as the previously described forms of the invention but in the shape necessary to fit within the generally rectangular or square tubular leg or post 5. The anchor plate 50, likewise, comprises a generally convex or dish-shaped base or body 51 having a central stud opening 52, the marginal portions of which define means for engaging the riveted or peened-over head 43 on the end of said stud 41. The arrangement is such that the reduced end of the stud 41 is adapted to extend through the central opening 52 in the anchor plate to a position in which the marginal portions of said central stud opening 52 seat on the collar 42 of said stud, as aforesaid, whereupon the free end of the stud 41 is riveted or peened over into a head 43 which retains the anchor plate in a fixed connected relation in the completed foot or tip assembly. The anchor plate 50 otherwise is provided in a generally rectangular configuration conforming to the general contour of the inner tubular wall of the generally square or rectangular post or leg 5. The periphery of said anchor plate is formed with notches or recesses in the form of narrow slits or slots 54 defining the diametrically opposite spring shoulders 55 having cutting edges on the extremities thereof and separated by similar land portions 57 of less length than said spring shoulders 55.

The foot or tip assembly thus provided, accordingly, is substantially equivalent to that of the previously described forms of the invention and likewise, may be easily and quickly inserted into the generally rectangular inner tubular wall of the post or leg 5 to provide a similar type of end construction in which the cutting edges on the extremities of the spring shoulders 55 of the anchor plate cut into and embed in the surface of said inner tubular wall to automatically lock the anchor plate 50 and the associated end fitting 40 in attached position on the end of said post or leg 5, substantially as shown in Fig. 7.

Fig. 10 shows the anchor plate 50 in a tubular post or leg of generally square or rectangular cross-section in an assembly of Fig. 1 wherein like parts are indicated by the same reference characters.

The anchor plate in any form preferably is constructed of relatively thin sheet metal the thickness of which is selected according to service requirements and the predetermined size of the parts to be secured. The anchor plate is most effective when provided of spring metal suitably spring tempered and otherwise treated to give the desired toughness and hardness, particularly in the case of devices which are used in heavy duty applications. A cheap and highly effective anchor plate may be provided from cold rolled metal such as cold rolled steel which is untempered but of a spring metal nature and capable of providing an effective and reliable securing device, as and for the purposes described.

While the invention has been described in detail with specific examples, such examples are intended as illustrations only inasmuch as the invention fully contemplates various modifications which may be resorted to without departing from the spirit and scope of the invention.

What is claimed is:

1. A caster glide for use with a furniture post construction comprising a post end having an inner tubular wall, said glide comprising an end fitting having a stud and an anchor plate adapted for self-locking attachment in a tubular post end, said anchor plate comprising a sheet metal body defining a base and means on said base connected to said stud on the fitting, said sheet metal body having resilient shoulders on its periphery and land portions between said resilient shoulders supporting said resilient shoulders against distortion, said resilient shoulders being provided with cutting elements adapted to cut into the inner tubular wall of said post end to secure said fitting in attached position thereon.

2. A caster glide for use with a furniture post construction comprising a post end having an inner tubular wall, said glide comprising an end fitting having a stud and an anchor plate adapted for self-locking attachment in a tubular post end, said anchor plate comprising a sheet metal body having a generally convex upper surface and defining a base and means on said base connected to said stud on the fitting, said generally convex sheet metal body having resilient shoulders on its periphery extending downwardly from said base and land portions between said resilient shoulders supporting said resilient shoulders against distortion, said resilient shoulders being provided with cutting elements adapted to cut into the inner tubular wall of said post end to secure said fitting in attached position thereon.

3. A caster glide for use with a furniture post construction comprising a post end having an inner tubular wall, said glide comprising an end fitting having a stud and an anchor plate adapted for self-locking attachment in a tubular post end, said anchor plate comprising a sheet metal body defining a base and stud engaging means on said base connected to said stud on the fitting, said sheet metal body having recesses on its periphery defining resilient shoulders and land portions between said resilient shoulders supporting said resilient shoulders against distortion, said resilient shoulders terminating in cutting edges adapted to cut into said inner tubular wall of said post end to secure the fitting in attached position thereon.

4. A caster glide for use with a furniture post construction comprising a post end having an inner tubular wall, said glide comprising an end fitting having a stud and an anchor plate adapted for self-locking attachment in a tubular post end, said anchor plate comprising a sheet metal body having a generally convex upper surface and defining a base and stud engaging means on said base connected with said stud on the fitting, said generally convex sheet metal body having recesses on its periphery defining resilient shoulders extending downwardly from said base and land portions between said resilient shoulders supporting said resilient shoulders against distortion, said resilient shoulders terminating in cutting edges adapted to cut into said inner tubular wall of said post end to secure the fitting in attached position thereon.

5. A caster glide for use with a furniture post construction comprising a post end having an inner tubular wall, said glide comprising an end fitting having a stud, and a cushion member, a metal washer and an anchor plate assembled on said stud, said anchor plate comprising a sheet metal body having a generally convex upper surface and defining a base and stud engaging means on said base connected with said stud on the fitting, said generally convex sheet metal body having recesses on its periphery defining resilient shoulders extending downwardly from said base and land portions between said resilient shoulders supporting said resilient shoulders against distortion, said resilient shoulders terminating in cutting edges adapted to cut into said inner tubular wall of the post end to secure said fitting in attached position thereon.

6. A caster glide for use with a furniture post construction comprising a post end having an inner tubular wall, said glide comprising an end fitting having a stud, and a cushion member, a metal washer and an anchor plate assembled on said stud, said anchor plate comprising a sheet metal body having a generally convex upper surface and defining a base and tongues stamped from said base clutching said stud on the fitting, said generally convex sheet metal body having recesses on its periphery defining resilient shoulders extending downwardly from said base and land portions between said resilient shoulders, said resilient shoulders terminating in cutting edges adapted to cut into said inner tubular wall of the post end to secure said fitting in attached position thereon.

7. A caster glide for use with a furniture post construction comprising a post end provided with an inner tubular wall having a generally rectangular cross-sectional area, said glide comprising an end fitting having a stud and an anchor plate adapted for self-locking attachment in said post end comprising a generally rectangular sheet metal body having a generally convex upper surface and defining a base and means on said base connected with said stud on the fitting, said generally rectangular convex sheet metal body having slits on its periphery defining resilient shoulders extending downwardly from said base and land portions between said resilient shoulders supporting said resilient shoulders against distortion, said resilient shoulders terminating in cutting edges adapted to cut into said inner tubular wall of the post end to secure said fitting in attached position thereon.

8. A caster glide for use with a furniture post construction comprising a post end having an inner tubular wall, said glide comprising an end fitting having a stud, an anchor plate adapted for self-locking attachment in said post end, and a bushing on said stud at the undersurface of said anchor plate extending from adjacent said stud to adjacent the periphery of said anchor plate, said anchor plate comprising a sheet metal body defining a base and stud engaging means on said base connected to said stud on the fitting, said sheet metal body having recesses on its periphery defining resilient shoulders and land portions between said resilient shoulders supporting said resilient shoulders against distortion, said resilient shoulders terminating in cutting edges adapted to cut into said inner tubular wall of the post end to secure said fitting in attached position thereon.

9. A caster glide for use with a furniture post construction comprising a post end having an inner tubular wall, said glide comprising an end fitting having a stud, an anchor plate adapted for self-locking attachment in said post end, and a bushing on said stud at the undersurface of said anchor plate extending from adjacent said stud to adjacent the periphery of said anchor plate, said anchor plate comprising a sheet metal body defining a base and tongues stamped from said base clutching said stud on the fitting, said sheet metal body having recesses on its periphery defining resilient shoulders and land portions between said resilient shoulders supporting said resilient shoulders against distortion, said resilient shoulders terminating in cutting edges adapted to cut into said inner tubular wall of the post end to secure said fitting in attached position thereon.

10. A caster glide for use with a furniture post construction comprising a post end having an inner tubular wall, said glide comprising an end fitting having a stud, an anchor plate adapted for self-locking attachment in said post end, and a bushing on said stud at the undersurface of said anchor plate extending from adjacent said stud to adjacent the periphery of said anchor plate, said anchor plate comprising a sheet metal body having a generally convex upper surface and defining a base and tongues stamped from said base clutching said stud on the fitting, said sheet metal body having recesses on its periphery defining resilient shoulders and land portions between said resilient shoulders supporting said resilient shoulders against distortion, said resilient shoulders terminating in cutting edges adapted to cut into said inner tubular wall of the post end to secure said fitting in attached position thereon.

11. An anchor plate comprising a sheet metal body defining a base and means on said base for engaging a stud, said sheet metal body having recesses on its periphery defining resilient shoulders and land portions between said resilient shoulders supporting said resilient shoulders against distortion, said resilient shoulders terminating in cutting edges.

12. An anchor plate comprising a sheet metal body having a generally convex upper surface and defining a base and means on said base for engaging a stud, said sheet metal body having recesses on its periphery defining resilient shoulders and land portions between said resilient shoulders supporting said resilient shoulders against distortion, said resilient shoulders terminating in cutting edges.

13. An anchor plate comprising a sheet metal body having a generally convex upper surface and defining a base and tongues stamped from said base for clutching a stud, said sheet metal body having recesses on its periphery defining resilient shoulders and land portions between said resilient shoulders supporting said resilient shoulders against distortion, said resilient shoulders terminating in cutting edges.

14. A caster glide for application to the lower open end of a hollow cylindrical furniture leg, a base glide structure having provision for supporting the leg from its lower edge, a retainer in the form of a shallow umbrella of resilient material, and a stem structure fastened to the umbrella adjacent its center and supporting it from the base structure, said retainer having a body with rounded edge portions and projections extending laterally beyond said edge portions.

15. A caster glide for use with a furniture post construction comprising a post end having an inner tubular wall, said glide comprising an end fitting having a stud, an anchor plate adapted for self-locking attachment in a tubular post end and a bushing of flexible and compressible material on said stud at the underside of said anchor plate extending from said stud to adjacent the periphery of said anchor plate, said anchor plate comprising a sheet metal body defining a base and means on said base connected to said stud on the fitting, said sheet metal body having resilient shoulders on its periphery provided with cutting elements adapted to cut into the inner tubular wall of said post end to secure said fitting in attached position thereon.

16. A caster glide for use with a furniture post construction comprising a post end having an inner tubular wall, said glide comprising an end fitting having a stud, an anchor plate adapted for self-locking attachment in a tubular post end and a bushing of flexible and compressible material on said stud at the under surface of said anchor plate extending from adjacent said stud to adjacent the periphery of said anchor plate, said anchor plate comprising a sheet metal body having a generally convex upper surface and defining a base, and means on said base connected to said stud on the fitting, said sheet metal body having resilient shoulders on its periphery extending downwardly from said base and provided with cutting elements adapted to cut into the inner tubular wall of said post end to secure said fitting in attached position thereon.

17. A mount for insertion in a hole in the bottom of a furniture leg which comprises a floor-engaging element, a cushion secured to said element and positioned thereon to lie between the bottom of the leg and said element, a retainer seat of flexible compressible material supported by the cushion and adapted to enter said hole, an assembly pin projecting upwardly from the cushion and through the seat and a flexible retainer secured to the pin and held thereby against the compressible seat, the retainer having sharp corners protruding laterally from the seat and being made of a hard material of sufficient size to cause said corners to engage and bite into the side walls of the leg hole.

18. A mount according to claim 17 in which the retainer has wall engaging portions which comprise fingers having parallel sides and end edges which extend at a right angle to the side edges.

19. A mount according to claim 17 in which the wall-engaging portions of the retainer are normally bowed downwardly.

20. A mount according to claim 17 comprising also a rigid base member interposed between the compressible retainer seat and the cushion, and engageable with the leg bottom around the hole, said member having an opening through which the pin extends with a clearance.

21. A mount according to claim 17 in which the retainer is substantially a rectangular sheet of spring metal.

GEORGE A. TINNERMAN.

REFERENCES CITED

The following references are of record in the file of this patent:

UNITED STATES PATENTS

| Number | Name | Date |
|---|---|---|
| 576,675 | Ill | Feb. 9, 1897 |
| 938,866 | Humphrey | Nov. 2, 1909 |
| 1,029,705 | McIntyre | June 18, 1912 |
| 1,580,781 | Fitch | Apr. 13, 1926 |
| 1,971,881 | Tinnerman | Aug. 28, 1934 |
| 2,238,705 | Miller | Apr. 15, 1941 |
| 2,398,374 | Hartman | Apr. 16, 1946 |
| 2,454,739 | Henorickson | Nov. 23, 1948 |